(No Model.)
W. W. WEBSTER & J. L. HANGI.
FASTENER FOR THE MEETING RAILS OF SASHES.
No. 512,593. Patented Jan. 9, 1894.
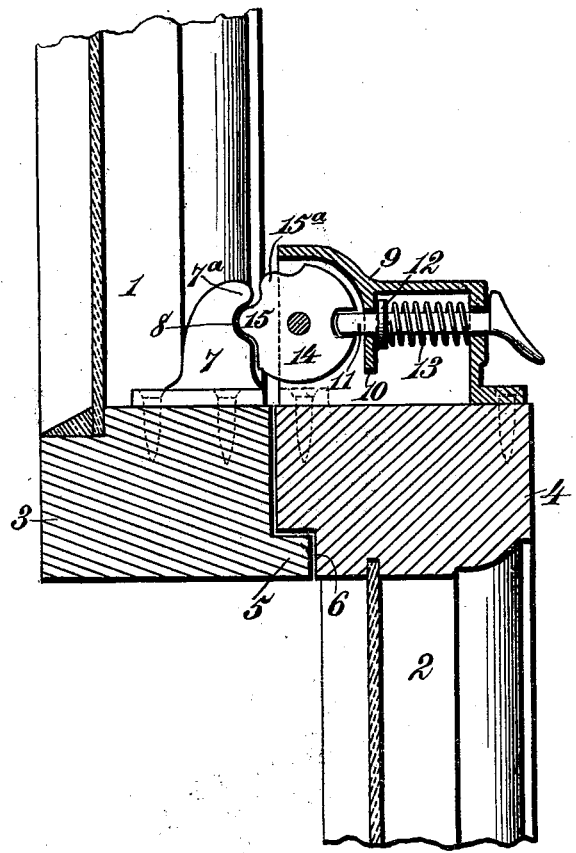
Witnesses.
Robert Emmett
Dennis Sumby
Inventors,
Walter W. Webster
John L. Hangi.
By James L. Norris.
Atty.
THE NATIONAL LITHOGRAPHING COMPANY,
WASHINGTON, D. C.

UNITED STATES PATENT OFFICE.

WALTER W. WEBSTER AND JOHN L. HANGI, OF SCRANTON, PENNSYLVANIA.

FASTENER FOR THE MEETING-RAILS OF SASHES.

SPECIFICATION forming part of Letters Patent No. 512,593, dated January 9, 1894.

Application filed April 15, 1893. Serial No. 470,495. (No model.)

*To all whom it may concern:*

Be it known that we, WALTER W. WEBSTER and JOHN L. HANGI, citizens of the United States, residing at Scranton, in the county of Lackawanna and State of Pennsylvania, have invented new and useful Improvements in Sash Locks or Fasteners, of which the following is a specification.

Our invention relates to window-sash locks or fasteners and has for its object to provide a novel, simple, economical and efficient lock or fastener, which shall automatically lock or fasten the sashes against opening when the meeting rails of the sashes come together and the window is closed and which may be disengaged by a single act of the operator.

To such end our invention consists in the novel construction and combination of parts hereinafter described and claimed, reference being had to the accompanying drawing, wherein the figure is a vertical sectional view of portions of two window sashes showing our invention applied to the meeting rails thereof.

In the said drawing, the reference numerals 1 and 2, designate, respectively, the upper and lower sashes of a window, the meeting rails 3, and 4, whereof are, preferably but not essentially, provided, one with an extending part 5 and the other with a corresponding recess 6, for an obvious purpose, that is to say, to more effectually prevent the entrance of cold or dust between the said meeting rails.

To the meeting rail 3, of the upper sash 1, is attached in any suitable manner, as by screws, as shown, a stationary catch-plate 7, the operative face of which is provided with a tooth-engaging recess 8, of which there may be one or a plurality. The upper end of the catch-plate is provided with a curved part 7$^a$, to engage one of the teeth of the hereinafter described wheel or disk when the meeting rails 3, 4, are coming together so that said wheel will be turned into proper position to receive the bolt to lock the sashes together when closed.

The numeral 9, indicates a casing secured to the meeting rail 4, of the lower sash 2, the rear end, or that end which points toward the catch-plate 7, being open. Within this casing is formed or suitably secured a depending extension 10, which is perforated or provided with an orifice, a similar orifice being also provided in the same line therewith in the front wall of the casing 9. A bolt 11, is fitted to slide in the said orifices, the acting end of which extends in rear of the extension 10, the sliding movement of which is limited in one direction by a collar 12, formed therewith or secured thereto, and which engages the extension 10 when said bolt is in its operative position. Surrounding said bolt 11, and having bearing at one end against the front wall of the casing 9, and at the other end against the extension 10, is a coiled spring 13, which normally operates to force the bolt 11 into its operative position and retain it in such position.

A rotating wheel or disk 14, is suitably journaled in the rear open end of the casing 9, one part of the periphery of which is provided with teeth, preferably two 15, 15$^a$, to engage the recess 8, in the catch plate 7 when the meeting rails 3, 4, come together. In the periphery of said wheel or disk, opposite the toothed portion, is formed a bolt-socket or recess 16, so arranged that when the window-sashes are closed, it will be in position to receive the acting end of the bolt 11.

When the parts are in the position illustrated in the figure, it will be seen that the wheel 14, is securely locked from rotation and the tooth 15 thereon fitting the recess 8, in the catch-plate 7, securely locks the sashes together from being opened from the outside.

When it is desired to raise the lower sash or lower the upper sash, the bolt 11 is retracted against the face of the spring 13, removing its end out of the socket in the wheel 14, so that said wheel is free to rotate and the sashes to be raised or lowered, the end of the bolt resting on the periphery of the wheel or disk. If the lower sash be raised, or the upper sash lowered, the wheel 14, will be rotated to the left, bringing the tooth 15, to its lowermost position, and when it is again raised to close the window, the curved part 7$^a$ of the catch-plate will engage the lower edge of the tooth 15$^a$, rotating the wheel in the opposite direction, bringing the tooth 15 into the recess 8, and the socket 16 into register with the bolt 11, when the spring will force said bolt into said socket, thus locking the sashes together automatically.

It will be observed that the latch-plate may be placed upon the lower sash, and the rotating wheel or disk and the bolt upon the upper sash, without departing from the scope of this invention.

Having thus described our invention, what we claim is—

In a window sash-lock or fastener, the combination with a catch-plate secured to one sash, of a toothed wheel or disk secured to the other sash and provided with a socket, and a spring controlled bolt in operative relation to said wheel or disk, to automatically enter the socket in said wheel or disk when the sashes are closed, substantially as described.

In testimony whereof we have hereunto set our hands in presence of two subscribing witnesses.

WALTER W. WEBSTER.
JOHN L. HANGI.

Witnesses:
H. C. REYNOLDS,
GEO. W. MARSHALL.